Patented May 27, 1941

2,243,143

UNITED STATES PATENT OFFICE 2,243,143

PREPARATION OF HOP EXTRACT

Lyndon D. Wood, Chicago, Ill., assignor to National Hops Laboratories, Inc., Chicago, Ill., a corporation No Drawing. Application February 2, 1939, Serial No. 254,313

5 Claims. (Cl. 99—50.5)

The present invention relates to the separation of the essential principles of hops and more particularly to the production of an extract or similar product useful in beer making and the like.

It is an object of the present invention to provide an improved process for separating or extracting the essential constituents of hops in a simple, inexpensive and efficient manner.

The present application is more particularly a continuation in part of my application Serial No. 147,141, filed June 8, 1937.

In this earlier filed application there is disclosed a process for forming an extract of hops, which extract contains substantially all of the constituents of hops which are desirable in the manufacture of beer and for use in other arts in which hops or constituents of hops are employed. The principal ingredients of the hops which are extracted in accordance with the aforementioned invention are the hop oil, the hop seed oil, the tannin or tannic acid, and the lupulin. Hop seed oil has the peculiar property of adding foam to the beer and retaining it as pointed out in Serial No. 147,141, of which this application is a continuation-in-part.

In accordance with my earlier process substantially complete extraction and recovery of the desired components is obtained by employing acetone as a solvent and extraction agent, which extraction agent is capable of the desired extraction at a non-elevated temperature. It was pointed out in my previous application aforesaid that a substantially complete yield is furthermore promoted by carrying out the extraction and related treatments in closed containers which prevent evaporation and loss of the relatively volatile, aromatic hop oil and by permitting intermixture of the hop oil with the oil contained in the seed of the hops, which tends to fix and retain the former. The solvent or extraction agent employed in my aforementioned invention comprises preferably acetone, which possesses a high solvent affinity for the desired ingredients of the hops and enables economical and expeditious treatment.

The present invention more particularly comprehends the use of an improved solvent and method for dissolving the aforesaid ingredients of the hops in the formation of an extract or concentrated product.

In accordance with the present invention I have discovered that the aforementioned process may be yet further improved by the use of a novel solvent, particularly when the hops are first treated in such a manner as to soften the lupulins and as to render them more susceptible to the action of the solvent. The solvent which it is proposed to use in accordance with the present invention is isopropanol, which is the secondary alcohol having the following formula: $CH_3CH(OH)CH_3$. This substance must be distinguished from ethyl alcohol, for example, in that it is a different product possessing widely divergent properties. Thus, isopropanol possesses solvent properties which vary considerably from ethyl and similar primary alcohols, particularly in respect to its solvent action upon many fats, oils, waxes, and resinous materials. Isopropanol may be and generally is synthesized by reduction of acetone or is derived as a product of the petroleum cracking process. This solvent is capable of substantially completely removing from the hops the desired extract components by extraction in cold condition, that is, at ordinary room temperature or at various other desired temperatures favorable to the retention of the volatile hop components.

As hereinbefore mentioned, the present invention comprehends preferably the initial treatment of the hop material with an agent which renders the material more readily susceptible to the action of the other solvents. To this end there may be employed an alkaline solution, such, for example, as a solution of ammonia. The use of ammonia solutions as solvents for resinous materials has been hitherto proposed. In accordance with the present invention, however, it has been discovered and definitely established that ammonia or solutions thereof are not solvents for the resinous lupulin contained in the hop material and, therefore, cannot be practically employed for this purpose; however, it has been found that ammonia solutions do possess the property of softening lupulin, so that the substantially complete removal of this substance, and particularly the hard or gamma resins of lupulin, from the hops is facilitated by the solvent. Only relatively weak solutions of the ammonia are necessary to accomplish the present function. For example, for general usage a solution formed by adding only one part of ordinary ammonia water (10% $NH_3$) to ninety-nine parts of distilled water has been found adequate. On the other hand, it is preferable to increase the proportion of the ammonia water in some instances, particularly for the treatment of hops which are relatively matured or which have been stored or dried for some time, since in such products the lupulin exists in a more hardened state than in the case of fresh, green hops.

It will be understood that in accordance with the spirit of the present invention the preferred concentration of the ammonia water may be best determined by experiment for each particular type of material being treated. One illustrative method of carrying out the invention is as follows: Hops are first prepared by pulverizing them to a degree of fineness sufficient to crush all of the hop seeds which they contain, and for this purpose the degree of grinding should be sufficient so that the product will pass a 20-mesh screen. As pointed out in my aforesaid copending application Serial No. 147,141, the grinding facilitates the treatment and extraction of the product and by crushing the seeds permits the release of the hop seed oil contained therein for intermingling with the relatively volatile hop oil. Grinding may be carried out in any suitable type of mill or grinder, although it is preferred that the grinding be done in an enclosed space and under non-elevated temperature conditions so that the volatile contents of the batch of hops will not be dispersed.

If the material under treatment comprises so-called "old hops," in which a certain deterioration of the hop oil has occurred to produce a deleterious rancidity, the product is next treated or refined by the use of a suitable activated adsorbent material. In this connection, any of the activated carbons or their highly activated equivalents may be employed. To this end the ground hops are placed in a closed container and there is added thereto a quantity of finely powdered, activated carbon in the proportion of one-fourth ounce of activated carbon to each pound of pulverized hops; the charge is thoroughly intermixed to produce a homogeneous interspersion of the activated adsorbent agent and permitted to stand for two hours, during which time the rancid components and/or the portions inducing rancidity are destroyed or removed from the mass of hops.

To the product thus provided, and preferably while the product is in the same closed container, there is added a solution comprising one part of aqua ammonia (10%) in ninety-nine parts of distilled water, the amount of the addition being sufficient to thoroughly saturate all of the particles of the mass. The saturated mass is permitted to stand in the closed container for six hours while the softening of the resinous lupulin in the hop mass proceeds. It will be obvious from the above disclosure that the period of treatment will depend upon the age of the hops, the extent and condition of storage and drying of the hops, and the resultant extent to which the lupulin has been hardened. It has been found in some instances that improved results are obtained if the mass is permitted to stand for as long as twelve hours, although for each type and condition of hops under treatment the time of treatment will preferably be determined by experiment as to that which results in the substantially maximum yield.

To the container holding the mass of hops is now added isopropanol in the quantity of one pound of isopropanol to each pound of pulverized hops. The amount of isopropanol added may be varied widely, it being sufficient to completely cover the mass. At this point the mixture is thoroughly stirred to promote homogeneity. It will be apparent that the operations thus far may be carried out in any of the known closed containers provided with an internal mixer. The mixture is permitted to stand at a temperature of 100° F. for a period of twelve hours. At the end of this time the extraction liquid is separated from the solid material by filtering or percolation. More specifically, the mass is moved in any known closed conveyor to a closed percolator or filter and permitted to drain, suction being applied, if desired, to facilitate separation. The mass, containing a certain amount of absorbent moisture, is now placed in a closed press and subjected to sufficient pressure to express all of the residual liquid, which contains substantially all of the residual tannin, oils and lupulin of the original hop mass.

The liquid extract obtained is concentrated in a vacuum evaporator at a temperature not above 50° C. for a sufficient length of time to remove substantially all of the isopropanol and as much of the water content of the extract as desired. The resultant concentrated product is then adjusted to any desired standard of specific gravity, liquidity or the like, by the addition thereto of any desired amount of malt syrup and/or tannin and may then be sealed in suitable, preferably sterile containers for storage until such time as it may be used in any of the arts where hops are conventionally employed.

In carrying out the present invention, while it is possible to employ any of the types of apparatus disclosed in detail in the aforementioned copending application, it will be obvious that various other devices may be used for this purpose. Thus, there may be employed various known diffusion cells or extraction or percolating devices capable of promoting the extraction step. So also, it is contemplated, in accordance with the present invention, that the isopropanol solution be repeatedly employed on successive batches of the material until it becomes highly concentrated with the extracted solutes. In this manner the extraction agent finally becomes relatively saturated, thereby facilitating the final step of concentration.

The nature of the treatment of the hop mass by the solvent will, in accordance with the previous disclosure, depend upon the amount of moisture present in the original mass of hops and also upon the age of the hops and, accordingly, the relative proportion of gamma resins contained therein. While, in accordance with the present invention, it is preferred that the hops be relatively dry before attempting grinding, nevertheless when the moisture is relatively increased, a corresponding relative increase in the proportion of isopropanol is desirable in the process. So also, the length of time of the solvent treatment will depend principally upon the nature of the original hop mass. Thus, employing hops which are fresh, which have been dehydrated at low temperatures, and which have been kept in cool storerooms, an hour will be sufficient time to complete the action of the solvent in dissolving the lupulin. On the other hand, hops of older growths and those which have been subjected to more destructive drying and storing contain relatively more hardened or gamma resins, which are relatively difficultly soluble, and in order to produce substantially complete solution thereof the time necessary for the solvent action may be extended to twenty-four hours or even longer.

While in the above description the activated adsorbent carbon is added to the initially pulverized material, the addition of this refining agent may be made at substantially any other step in the process. Thus, for example, the activated carbon may be added to the liquid extract removed from the hops preferably in the proportion of one-fourth of an ounce of the carbon to each pound of the extract, although the quantity added may be varied in accordance with the extent of the treatment necessary. When added to the extract in this manner, it is preferred that after thorough mixing the carbon be separated from the extract by filtering or decantation. According to one preferred method of procedure, the admixture is permitted to stand for from two to four hours before filtering. The extraction step, while carried out at a temperature of about 100° F., may proceed under any desired temperature, although, as pointed out above, it is preferred that so-called normal or room temperature prevail to prevent loss of yield. In some instances where the container is completely closed it will be apparent that the temperature may be relatively increased, while in other instances a pronounced cooling may be desirable.

The present invention provides a process which substantially completely removes all of the desired components of hops and does so in a simple and efficient manner. In the past a surprisingly large percentage of the hop components have been lost before use. So also, in accordance with the present invention there is provided a product which may be preserved indefinitely without deterioration. The process may therefore be used to treat the hops while in a fresh condition in such a manner as to produce a concentrated product having indefinite keeping qualities. The weight and bulk of the fibrous and undesired components of the hop mass are thus eliminated.

The invention is hereby claimed as follows:

1. The process of extracting certain essential principles of hops which comprises treating the hops with an alkaline solution and subsequently subjecting the hops so treated to a solvent comprising isopropanol, the treatment with alkaline solution being continued for a sufficient period of time to render the lupulin more readily soluble in said isopropanol.

2. The process of extracting the essential principles of hops, comprising mixing pulverized hops with activated carbon in a closed container and allowing same to stand for a sufficient time to remove undesirable odors and tastes, adding a weak solution of ammonia and allowing the saturated mass to stand for a sufficient time to soften the resinous lupulin, adding isopropanol to the mass, stirring same and allowing it to stand, and thereafter extracting the liquid by suitable means, and evaporating the extract to remove substantially all of the isopropanol, and as much of the water as desired.

3. The process for extracting the essential principles of hops, consisting in pulverizing the mass of hops in a closed space and under non-elevated temperature conditions to prevent dispersion of the volatile contents of the hops, adding a solution of aqua-ammonia sufficient to saturate the mass and allowing same to stand for from six to twelve hours, adding isopropanol and allowing the mixture to stand for a period of twelve hours, thereafter separating the liquid from the solid material, concentrating the liquid extract for a sufficient length of time to remove substantially all of the isopropanol and as much of the liquid extract as desired.

4. The process for extracting the essential principles of hops, consisting in pulverizing the mass of hops in a closed space and under non-elevated temperature conditions to prevent dispersion of the volatile contents of the hops, adding a solution of aqua-ammonia sufficient to saturate the mass and allowing same to stand for from six to twelve hours, adding isopropanol and allowing the mixture to stand for a period of twelve hours, thereafter separating the liquid from the solid material, concentrating the liquid extract for a sufficient length of time to remove suubstantially all of the isopropanol and as much of the liquid extract as desired, extracting the activated carbon therein, and permitting the product to stand for a considerable period to remove rancidity from old hops.

5. The process for extracting the essential principles of hops, consisting in pulverizing the mass of hops in a closed space and under non-elevated temperature conditions to prevent dispersion of the volatile contents of the hops, adding a solution of aqua-ammonia sufficient to saturate the mass and allowing same to stand for from six to twelve hours, adding isopropanol and allowing the mixture to stand for a period of twelve hours, thereafter separating the liquid from the solid material, concentrating the liquid extract for a sufficient length of time to remove substantially all of the isopropanol and as much of the liquid extract as desired, repeatedly employing an isopropanol solution on successive batches of hops until it becomes highly concentrated with the extracted solutes, whereby the extraction agent becomes relatively saturated, thereby facilitating the final step of concentration.

LYNDON D. WOOD.